US011373197B2

(12) United States Patent
Nagarathinam

(10) Patent No.: US 11,373,197 B2
(45) Date of Patent: Jun. 28, 2022

(54) ENGAGING RETAIL CUSTOMERS OVER COMMUNICATION NETWORKS

(71) Applicant: Wal-Mart Stores, Inc., Bentonville, AR (US)

(72) Inventor: Arun Prasad Nagarathinam, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1625 days.

(21) Appl. No.: 14/520,926

(22) Filed: Oct. 22, 2014

(65) Prior Publication Data

US 2016/0117687 A1  Apr. 28, 2016

(51) Int. Cl.
*G06Q 30/02* (2012.01)
*G06Q 50/00* (2012.01)

(52) U.S. Cl.
CPC ..... *G06Q 30/0201* (2013.01); *G06Q 30/0205* (2013.01); *G06Q 30/0267* (2013.01); *G06Q 50/01* (2013.01)

(58) Field of Classification Search
CPC ............... G06Q 50/01; G06Q 30/0201; G06Q 30/0205; G06Q 30/0267
See application file for complete search history.

(56) References Cited

U.S. PATENT DOCUMENTS

| 7,945,483 | B2 | 5/2011 | Inghelbrecht | |
|---|---|---|---|---|
| 8,015,070 | B2 | 9/2011 | Sinha | |
| 8,447,645 | B2 * | 5/2013 | Rothman | G06Q 30/0206 705/7.35 |
| 2001/0039519 | A1 | 11/2001 | Richards | |
| 2002/0069115 | A1 | 6/2002 | Fitzpatrick | |
| 2003/0014348 | A1 | 1/2003 | O'Connor | |
| 2005/0160004 | A1 | 7/2005 | Moss | |
| 2009/0157487 | A1 | 6/2009 | Cottrell | |
| 2011/0046989 | A1 | 2/2011 | Crean | |
| 2012/0226570 | A1 * | 9/2012 | Kemp | G06Q 30/0623 705/26.1 |
| 2012/0284113 | A1 * | 11/2012 | Pollak | G06Q 30/0601 705/14.43 |

(Continued)

*Primary Examiner* — David J Stoltenberg
*Assistant Examiner* — Michael J Cross
(74) *Attorney, Agent, or Firm* — Bryan Cave Leighton Paisner LLP

(57) ABSTRACT

A historical-data module may retrieve historical prices and/or sales numbers for products at a presently-relevant, historical reference time and at other times in an interval encompassing the reference time. A comparison module may generate relative price values and/or sales-number values by comparing prices and/or sales numbers at the reference time to those at other times in the interval for various products. A selection module may select a subset of products with a favorable weighted combination of relative price values and/or sales-number values for a product report presented over a communication network, potentially with a graph of historical prices for the products. Information about a viewer of the product report may further tailor the report. Viewer information may include signals of product interest identified in social-networking posts by natural language processing, viewer search and/or purchase data, the viewer's relations in a social graph of a social networking platform, and/or geo-targeting.

23 Claims, 7 Drawing Sheets

(56) References Cited

U.S. PATENT DOCUMENTS

| | | | |
|---|---|---|---|
| 2013/0117106 A1* | 5/2013 | Glassman | G06Q 30/0223 705/14.53 |
| 2013/0138477 A1 | 5/2013 | Wilkins | |
| 2013/0325652 A1 | 12/2013 | Ouimet | |
| 2013/0332301 A1 | 12/2013 | Kilroy | |
| 2014/0040004 A1 | 2/2014 | Hamo | |
| 2014/0052533 A1 | 2/2014 | Mesaros | |
| 2014/0101607 A1 | 4/2014 | Chakra | |
| 2014/0114726 A1 | 4/2014 | Swinson | |

* cited by examiner

US 11,373,197 B2

ENGAGING RETAIL CUSTOMERS OVER COMMUNICATION NETWORKS

FIELD OF THE INVENTION

This invention relates to the engagement of potential customers over a communication network and more particularly to the engagement of customers through creating technologies providing services for those customers based on technological advances in those communication networks.

BACKGROUND OF THE INVENTION

Communication networks, such as the World Wide Web and mobile networks, enable retailers to offer products to customers anywhere at any time. However, the potential to access such products does not equate to actual customer realization of the potential. To rise above the noise, a retailer is well served to find ways to engage with its customers, building relationships and loyalty.

Providing a service that meets the needs of potential customers and/or enhances the customer's shopping experiences are examples of ways to build those relationships and that loyalty. Over the years, communication networks have continued to evolve with technologies that can be harnessed to increase access to information and network individual users. To better engage with potential customers, a retailer would be well served to develop further technologies to provide services and/or enhance the shopping experience by building new technologies on the technologies that have evolved to increase access to information and/or network individuals.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout. In some cases, particular instances of an element may be identified with a number followed by a letter, where the letter may change throughout the figures, indicating differing instances of the element with the same or varying attributes. References to elements by number only may refer more generally to a class of such elements.

Figure 1:
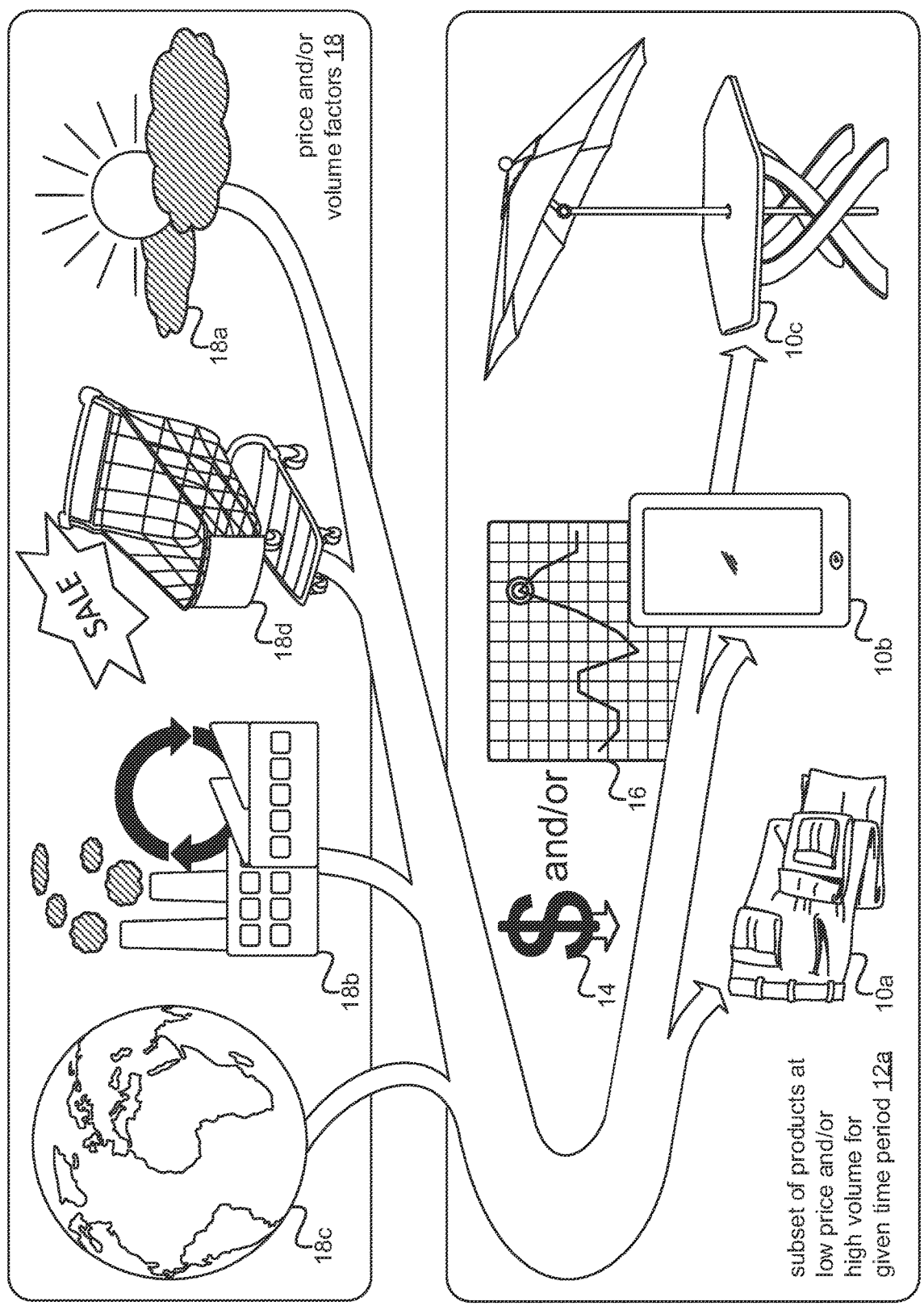
FIG. 1 is a schematic block diagram of potential products offered for sale by a retailer and the complexity of factors involved in the price of these products as it fluctuates with respect to time.

Referring to FIG. 1, several different products 10a-c, such as may be offered online by a retailer are depicted. Non-limiting examples may include, for example, khaki pants 10a, a tablet computing device 10b, and/or a patio table 10c. Such products 10 may pertain to a subset, or group, of products 12a selected from a larger set of products 10.

The subset of products 12a may include products 10a-c, with common attributes. For example, the subset of products 12a may include products 10a-c at, or near, a low price 14, relative to other historical prices of the products 10a-c. Additionally, or in the alternative, products 10a-c in the subset of products 12a, may share a potential to be at a spike in sales numbers 16. As can be appreciated, prices and/or sales numbers for products 10 can vary with time. Often, several factors 18 may be at play in the eventual price that is set for a product 10. Such factors 18 may be relatively apparent, but often may be obscure, counterintuitive, and be a part of a complex web of factors.

For example, with respect to the khaki pants 10a, the price may be greatly influenced by the price of cotton. A purchaser may try to anticipate a seasonal-demand factor 18a that would increase prices during times of large demand, such as the demand for cotton products in the hot summer months. However, a purchaser of cotton pants 10a, may not be aware that demand for cotton may actually peak four months in advance of the summer heat, in connection with a fabrication factor 18b, whereby apparel factories seek an adequate stock for their raw materials four months or more in advance.

Furthermore, a global-marketplace factor 18c may also place may play an important role in setting price. For example, India represents the second largest consumer of cotton in the world, with an annual consumption several times that of the United States. Furthermore, in India, the season of intense heat, when the demand for cotton is high, sets in during March, much earlier than summer heat in the United States. Conversely, anticipation of demand may actually lead to increased supply during periods of high demand, with annual promotional sales 18d leading to a period of reduced price.

Aside from the factors 18 discussed above, many other factors 18 not mentioned may also play a role in the price of products 10. For example, in the United States, the government operates a program of subsidies for cotton during counter-cyclical periods. Such political and/or other factors 18 may play an important role in setting prices.

Considering the complexity of the number of factors 18 that may play into the determination of product prices, the potential obscurity of some of those factors, and/or the counterintuitive nature of such factors, a service identifying products 10 potentially at periodic low prices 14 may be useful to potential customers. Identifying products 10a-c and/or providing information about such products 10a-c may be a helpful way to engage customers, build customer relationships, and/or draw potential customer traffic to an online presence for a retailer. Additional technologies may be developed to provide such service.

Just as providing information about products 10a-c at potentially periodic-low prices 14 may provide a helpful service to customers, information about products 10a-c that may be spiking in sales numbers 16 may be beneficial to retailers. In some examples, products 10a-c at potentially periodic-low prices 14 and that have a potential to be spiking at large sales numbers 16 may be included in a common, mutually beneficial subset of products 10 that informs consumers of low prices 14 and engages potential customers in sales decisions for products 10a-c with a current potential for high volumes of sales.

The same and/or similar factors 18 at play in determining prices may also play a role in determining sales numbers. These complexities of such factors 18, however, mitigate against the practicality of an a-priori approach that would attempt to calculate whether a product's 10 price and/or sales-volume has a potential to be at, or near, a potential low 14 and/or high 16, respectively. These considerations become even more pronounced when this complexity is greatly increased by the number of products 10 offered to customers, numbers measured, in some cases and/or for some retailers, by the hundreds of thousands.

However, technologies that make possible the storage and/or processing of data about large numbers of products 10, such as data about historical prices and/or sales numbers may be advanced to provide an a-posteriori approach to providing such services and advantages. The cyclical nature of factors 18, such as those discussed above, may allow determinations to be made about the potential for a product 10, in terms of relatively-low price 14 and/or relatively high sales volume 16, to be made with respect to present prices and/or sales. Even where the relevant factors 18 are less cyclical, historical data may have something to say about present price and/or sales relative to the future, such as when a price is near a low relative to a preceding span of time.

A brief overview outlining some concepts that may be applied to address these issues is set forth below. A system for promoting products 10 with prices at periodic lows 14 may include a database, a retrieval module, a comparison module and/or a selection module. The database may store historical data on prices and/or sales numbers for products 10 offered by a retailer. This historical data may be indexed to historical times.

The retrieval module may be operable to retrieve historical data on prices and/or sales numbers for a historical reference time. Such a historical reference time may be analogous to the present time relative to a cyclical time span, such as a year, a month, a season, etc. An instance of the cyclical time span may encompass the present time just as, for example and without limitation, a given day of a given month relative to the cyclical time span of a year. The historical data may further include a set of historical times within a historical instance of the cyclical time span traversing the historical-reference time, e.g. the year for the given day and the given month.

The comparison module may be operable to compare prices and sales numbers at the historical-reference time to prices and sales numbers from the set of historical times. Furthermore, the selection module may be operable to select products 10, such as a subset of products 12, for presentation based on relatively low prices 14 and/or relatively high sales numbers 16 at the historical-reference time in relation to prices and sales numbers from the set of historical times relative to other products 10.

Some examples may further include a presentation module. The presentation module may be operable to format information about the subset of products 12 for display over a communication network. For example and without limitation, the presentation module may format information about the subset of products 12 in Hyper Text Markup Language (HTML), and/or the like, to be accessed by a web browser. By way of another non-limiting example, the presentation module may be operable to display the subset of products 12 within a product-presentation application developed for a social networking platform. In some examples, the presentation module may provide additional historical price information to engage a viewer in the making of a purchase information for one or more products included in the subset of products 12.

Additionally, some examples may include a user-information module operable to acquire information about a user/viewer accessing the displayed subset of products 12. Such user/viewer information may be used to tailor the subset of products 12 to the particular user/viewer. For example, the user-information module may retrieve recent posts from a social-networking account of a potential user/viewer.

The user-information module may identify product signals indexed to individual products 10, which it may provide as user/viewer information. As an additional non-limiting example, the user-information module may access information about a user's relations to other elements of a social graph maintained by a social-networking platform. Additionally, the user-information module may utilize geo-targeting technologies to identify a location of a viewer/user. As can be appreciated, additional examples of user information, such as without limitation, search histories and/or buying patterns may also inform the selection of the subset of products 12 presented to a viewer/user.

Figure 2:
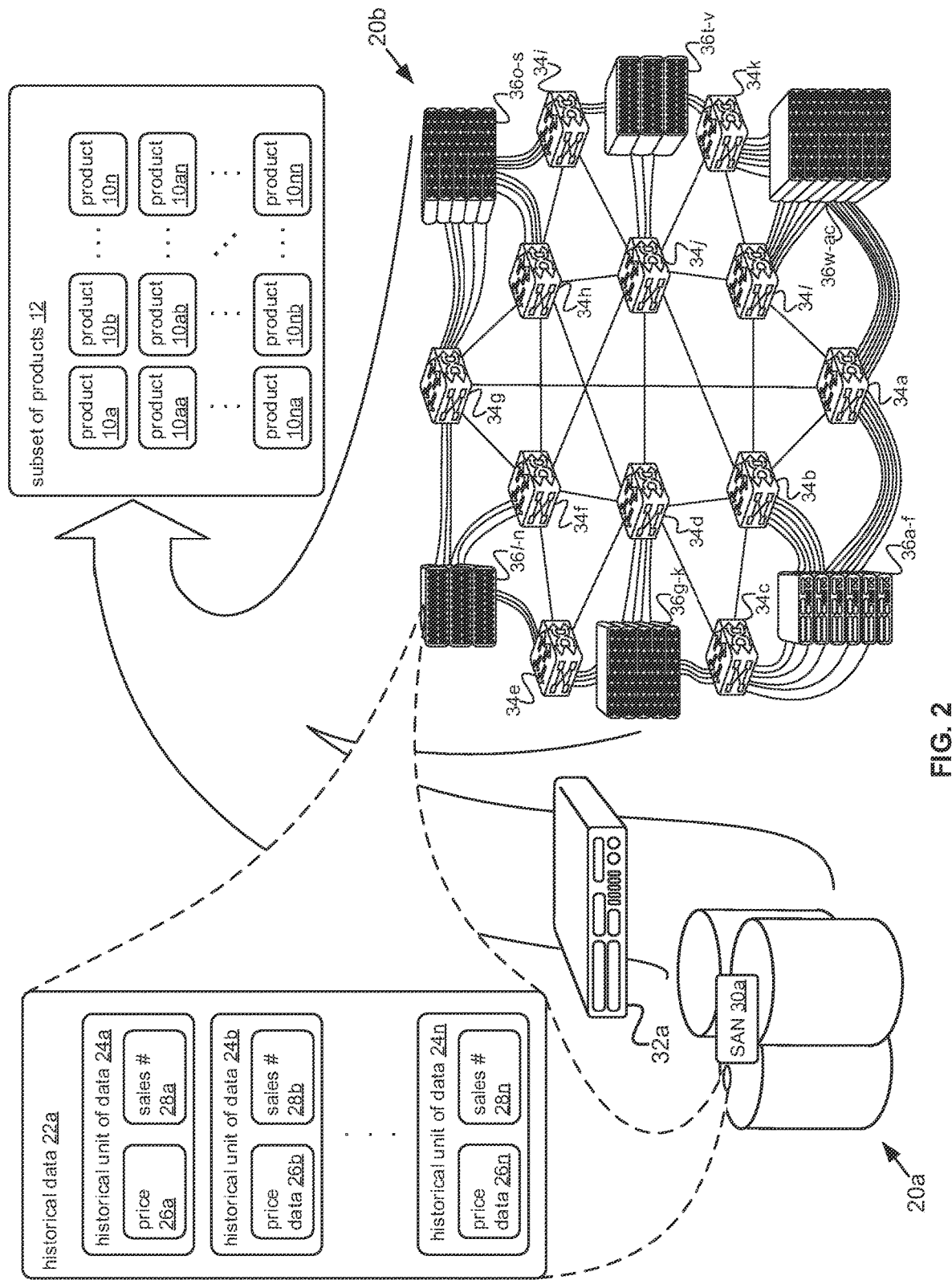
FIG. 2 is a schematic block diagram of alternative systems for providing a-posteriori approaches to identifying products near potential price-lows for a cyclical period of time by analyzing data, such as historical price data and/or sales numbers, stored in databases supported by various technologies, in accordance with examples.

Referring to FIG. 2, alternative technological approaches to implementing a-posteriori approaches 20a-b, relying on historical data 22a, are depicted. Such approaches may involve providing the physical infrastructure to digitally store a database with historical data 22a for multiple products 10, potentially for large numbers of products 10. As used herein, reference to a single database may refer to a single database, but it may also refer to multiple different databases with relevant information for purposes of discussion, explanation, and ease of reference.

The database may be a relational database, an object oriented database, and/or other types of databases. The database may be implemented by any one of a number of Data Base Management Systems (DBMS), such as, but way of example and not limitation, My Structured Query Language (SQL), PostgreSQL, Microsoft SQL Server, Oracle, SAP and/or IBM DB2. In examples implemented in a datacenter environment 20b, such as, without limitation, a Hadoop environment supporting a Hadoop Distributed Filing System (HDFS), additional elements, such as, without limitation, Apache Pig, Apache Hive, and/or Apache Spark may provide an interface between an HDFS and a DBMS.

The historical data 22a in the database may store historical data 22a for individual products 10 and/or may be indexed to historical times. In other words, for a given product 10, a unit of historical data 24a-n may be stored for an individual unit of time, such as a day, a week, a month, a quarter, a year, and/or the like and/or an individual product 10. Examples of such units of historical data 24a-n may include, for example and without limitation, a historical price 26a-n and/or a historical sales volume 28a-n, or sales number 28a-n, for the given moment in time, or historical time, and/or product 10 corresponding to the unit of historical data 24a-n. As can be appreciated, other categories for units of historical data 24 are also possible.

One non-limiting example system 20a may include a Storage Area Network (SAN) 30a providing the physical infrastructure for the database. Providing the physical resources for the processing involved in these disclosure, one or more computing machines 32, such as one or more servers, may be communicatively coupled with the SAN 30a. The one or more computing machines 32 may include one or more processors, units of memory, and/or other components commonly provided with computing machines 32 and may be operable to retrieve historical data 22, compare and/or analyze the historical data 22, and to select products 10 for a subset of products 12.

Another non-limiting example of a system 20b capable of supporting massive amounts of data may be implemented in a datacenter 20b. Such a datacenter 20b may include intermediate nodes 12a-l, such as switches, routers, hubs, load balancing servers, mirror servers, and/or the like. The datacenter 20b may also include various end hosts 34a-ac operable to send and/or to receive data from and/or to one another. The end hosts 34a-ac may be operable to store historical data 22 and/or may include, the computing machines 32 discussed above, one or more processors, units of memory, and/or other components commonly provided with computing machines 32. Examples involving a datacenter 20b may further implement a distributed file system for storing the historical data 22, such as, without limitation, HDFS.

Additionally, such a datacenter 20b may implement a processing engine, such as, by way of example and not limitation, a MapReduce engine, such as, without limitation, Hadoop. As with the one or more computing machines in the previous exemplary system 20a, such a processing engine may be operable to retrieve historical data 22, compare and/or analyze the historical data 22, and to select products 10 for a subset of products 12. As can be appreciated, other approaches to parallel processing and/or storage are possible, such as, by way of example and without limitation, CASSANDRA and OPENSTACK.

One or more computing machines 32 and/or a datacenter 20b may processes the historical data 22 to identify a set, or subset of products 12. As used herein, the terms set and subset may include any number of elements, including a single element or many elements and may also refer to the null set. Individual products 10a-mn may be selected for inclusion in the subset 12, as discussed above based on relatively low prices 14 and/or relatively high sales numbers 16 for the selected products 12 compared to prices and sales numbers for other products 10 for which historical data 22 is maintained. The processing of the historical data 22 to identify the subset of products 12 may further be understood in terms of modules.

With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of a module, and possibly all of the modules, that are implemented with software may be executed on a micro-processor, Central Processing Unit (CPU) and/or the like. Any hardware aspects of the module may be implemented to interact with software aspects of a module.

Figure 3:
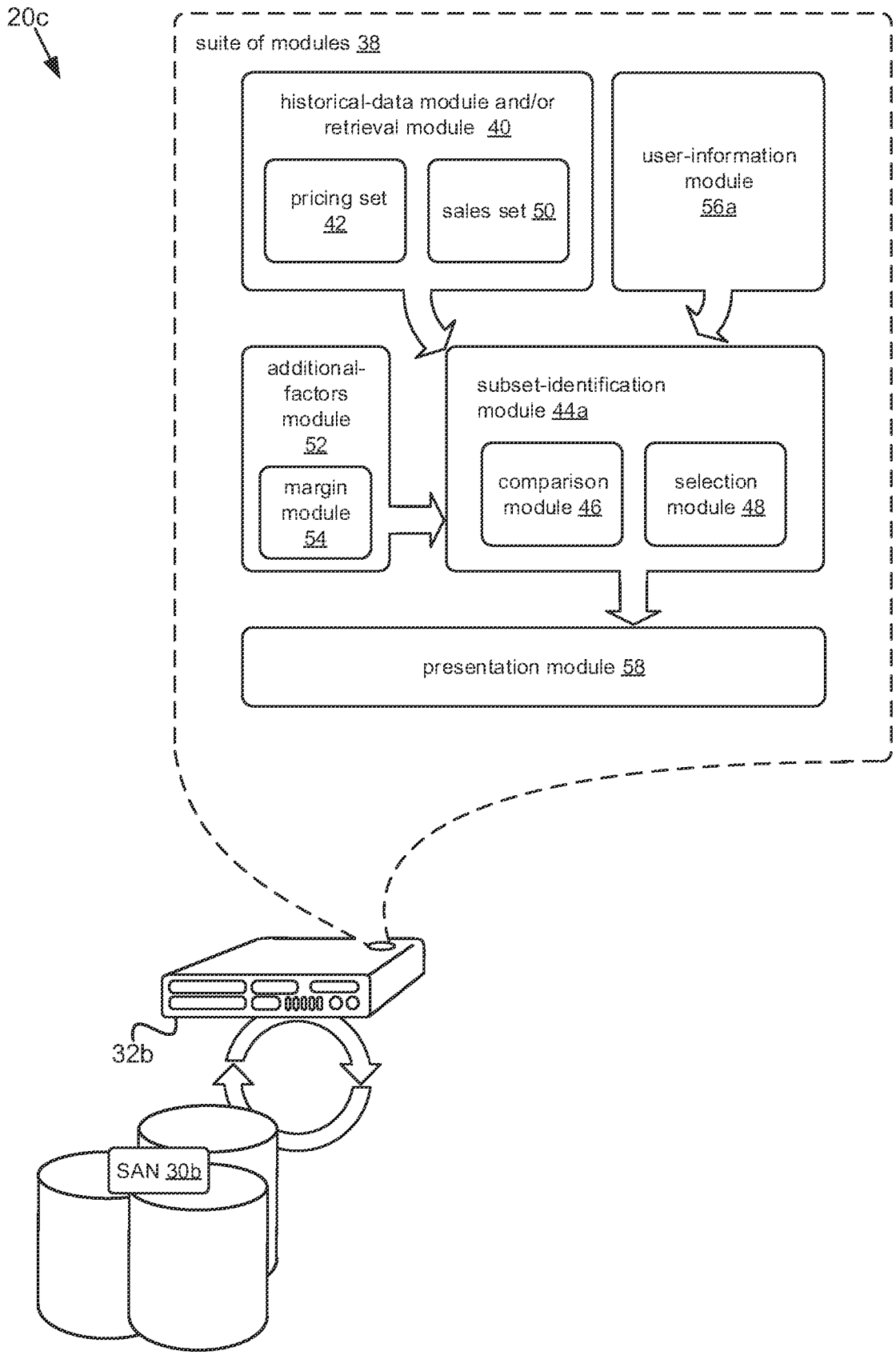
FIG. 3 is a schematic block diagram of a system for generating a set of products at, or near, potential periodic lows, together with exemplary modules that may collect, compare, and/or analyze historical data, and potentially other data, to generate the set of products, in accordance with examples.

Referring to FIG. 3, an exemplary system 20c for generating a report on products at, or near, potential periodic lows is depicted together with exemplary modules. As can be appreciated, the system 20c is similar to the first system 20a depicted in the previous figure in as much as it also includes a SAN 30b and one or more computing machines 32b. However, the modules discussed with respect to FIG. 3 as residing at the one or more computing machines 32b may be understood to be supported on a wide variety of different physical technologies, such as, without limitation, a datacenter 20b, as also discussed with respect to the previous figure.

By way of example, and not limitation, a suite of modules 38 within a system 20, such as the system 20c for identifying seasonally low prices depicted in FIG. 3, may include a historical-data module 40, which may also be referred to as a retrieval module 40. A historical-data module 40 may be operable to retrieve, from a database, historical data 22 including historical prices 26 for a pricing set of products 42 offered for sale by a retailer. In some examples, the historical-data module 40 may also retrieve historical data 22 that may include historical sales volume data 28, or historical sales numbers 28, for products 10, which may also come from the retailer.

The suite of modules 38 may also include a subset-identification module 44a, a comparison module 46, and/or a selection module 48. A subset-identification module 44a may be operable to compare historical prices 26 for the pricing set 42 at a presently relatable time to historical prices 26 for the pricing set of products 42 across a time interval. For example, in one case, the present time may correspond to the third week in September. In such examples, the time interval may be last year. In which case, the presently relatable time would be the third week in September of the previous year. Accordingly, the subset-identification module 44a may compare the historical prices 26 at the third week in September of the previous year for various products 10 in the historical data 22 to the historical prices 26 of those products 10 during the remaining fifty-one weeks of the previous year.

In examples where the historical data 22 further includes historical sales-volume data 28, the historical-data module 40 and/or a retrieval module 40 may retrieve historical sales-volume data 28 for a sales set of products 50. The sales set 50, depending on the example, may include products 10 in the pricing set 42. Additionally, the sales set 50 may larger than, smaller than, or coterminous with the pricing set 42 in terms of the products 10 included in the sales set 50 relative to the products included in the pricing set 42. In such examples, the subset-identification module 44a and/or comparison module 46 may further be operable to compare historical sales-volume data 28 for a sales set of products 50 at the presently relatable time to historical sales-volume data 28 for the sales set of products 50 across the time interval.

Additionally, the subset-identification module 44a and/or a selection module 48 may identify an initial set of products. The initial set of products may include products 10 for which historical prices 26 at the presently relatable time are comparatively low 14 in relation to other historical prices 26 across the time interval and relative to other products 10, such as products 10 in the pricing set 42. Similarly, in examples where the historical data 22 further includes historical sales-volume data 28, the subset-identification module 44a may be further operable to identify the subset of products 12 with both historical prices 26 and historical sales numbers 28.

In such examples, the subset-identification module 44a and/or a selection module 48 may select the subset of products 12 with a combination of comparatively high sales-volume 16 and comparatively low prices 14. Products 10 in the subset of product may be determined by historical prices 26 and/or historical sales numbers 18 at the presently relatable time in relation to other historical sales-volume data 28 and prices 26 across the time interval. Furthermore, the selected products 10 may have a combination of comparatively high sales-volume 16 and comparatively low prices 14 relative to other products 10 in the pricing set 42 and/or in the sales set 50.

In some examples, differing sizes for the 10 the pricing set 42 and the sales set 50 may be employed to more efficiently perform the selection of products 10 for the subset based on a combination of comparatively high sales-volume 16 and comparatively low prices 14. For example, the retrieval module 40 may be operable to retrieve historical data 22 limited to a first category. This first category may be defined by, for example, prices 26 or sales numbers 28 for an initial set of products. Hence, the initial set of product may be either the pricing set 42 or the sales set 50.

In such examples, the subset-identification module 44a, comparison module 46, and/or selection module 48 may be operable to create a narrowed set of products from the initial set. Depending on whether the first category is defined by prices or sales numbers, the narrowed set may be based respectively on relatively low prices 14 or relatively high sales numbers 16. For the products 10 in the narrowed set in such examples, the retrieval module 40 may be operable to next retrieve historical data 22 limited to a remaining category. The remaining category may be defined by whichever of the category of prices and sales numbers is not already taken to define the first category and to generate the narrowed set.

Consequently, the reduced size of the narrowed set may be leveraged to retrieve fewer historical prices 26 or historical sales numbers 28 and/or to perform fewer comparisons. Ultimately, in such examples, the subset-identification module 44a, comparison module 46, and/or selection module 48 may be operable to create a selected set of products 12 from the narrowed set based on one of relatively low prices 14 and relatively high sales numbers 16 for the remaining category. For certain examples, prices and/or sales numbers may not be the only example of factors that may be utilized to determine the subset of products 12.

An additional-factors module 52 may be included to provide data correlated to individual products 10 about one or more additional factors. A retailer may maintain additional data about its products that the retailer may find to be helpful in selecting products 10 for the subset of products 12. The additional-factors module 52 may provide such additional data to the subset-identification module 44a, comparison module 46, and/or selection module 48 for incorporation into the process for identifying products 10 for the subset of products 12. Information about the profit a retailer makes on the sale of various products 10 provides one non-limiting example of such a factor.

In such examples, a margin module 54, potentially within the additional-factors module 52, may retrieve profit-margin data from a database for products 10 in the set of products being evaluated and/or identify a profit margin for products 10 in these products. In such examples, the subset-identification module 44a, comparison module 46, and/or selection module 48 may be further operable to identify the subset of products 12 with a combination of a comparatively high profit margin relative to other products 10 in the set of products being evaluated and comparatively high historical sales-volume 16 and/or comparatively low historical prices 14. As before, the comparatively high historical sales-volume 16 and/or comparatively low historical prices 14 may be determined by sales numbers 28 and/or prices 26 at the presently relatable time in relation to other historical sales-volumes 26 and other historical prices 28 across the time interval relative to other products 10 in the set of products under evaluation.

Aside from, or in addition to, data about one or more additional factors relevant to the products being evaluated, in some examples, information about a potential user, or viewer, seeking access to the selected subset of products 12 may be used to tailor the selected subset of products 12 to the potential viewer/user. In such examples, the suite of modules 38 may include a user-information module 56a. The user-information module 56a may be operable to retrieve information about an individual that may have a potential to access the subset of products 12 over the communication network. Non-limiting examples of how such potential users/viewers may be identified are discussed in further detail below.

Depending on the example, the subset-identification module 44a, comparison module 46, and/or selection module 48 may be operable to tailor the subset 12 to the user/viewer with the information about the user/viewer in a variety of ways. For example, the subset-identification module 44a may instruct the historical-data module 40, or retrieval module 40, to retrieve historical data 22 for a product 10 suggested by the information about the user/viewer as a product of interest to the user/viewer, which may be calculated as an interest score, to be included in the evaluation performed by the subset-identification module 44a, comparison module 46, and/or selection module 48.

Additionally, or in the alternative, the subset-identification module 44a, comparison module 46, and/or selection module 48 may generate interest scores by applying the information about the user to a set of products being evaluated. The subset-identification module 44a, comparison module 46, and/or selection module 48 may select products with a favorable, combined, weighted value derived from weighted values for an interest score and relative price 14 and/or relative sales volume 16 at the presently relatable time in relation to historical prices 26 and sales volumes 28 across the time interval. In such examples, different weights may be applied as multiplicative factors depending on a deemed importance for the various factors. Additionally, the factor values may be derived from mathematical operations performed on underlying values. For example, the value for the relative price may be the inverse of the relative price.

As yet another non-limiting alternative, or additional, approach to incorporating user/viewer information, the subset-identification module 44a, comparison module 46, and/or selection module 48 may alter the subset 12. Depend on the examples, the selected subset 12 may be altered by removing a product 10 inconsistent with the information about the user/viewer. Additionally, or in the alternative, the selected subset 12 may be altered by adding a product 10 with a favorable interest score. In examples where a product 10 is added to the selected subset 12, additional factors, such as relative price 14 and/or relative sales numbers 16 may also be evaluated.

A presentation module 58 provides another example of a module that may be included within a potential suite of modules 38. The presentation module 58 may be operable to format information about the subset of products 12 for display over a communication network. Exemplary, non-limiting aspects of such a presentation module 58 are discussed with the help of the following pair of figures, which depict different potential examples of ways in which a preparation module 58 may prepare information about the subset of products 12 for display over a communication network.

Figure 4:
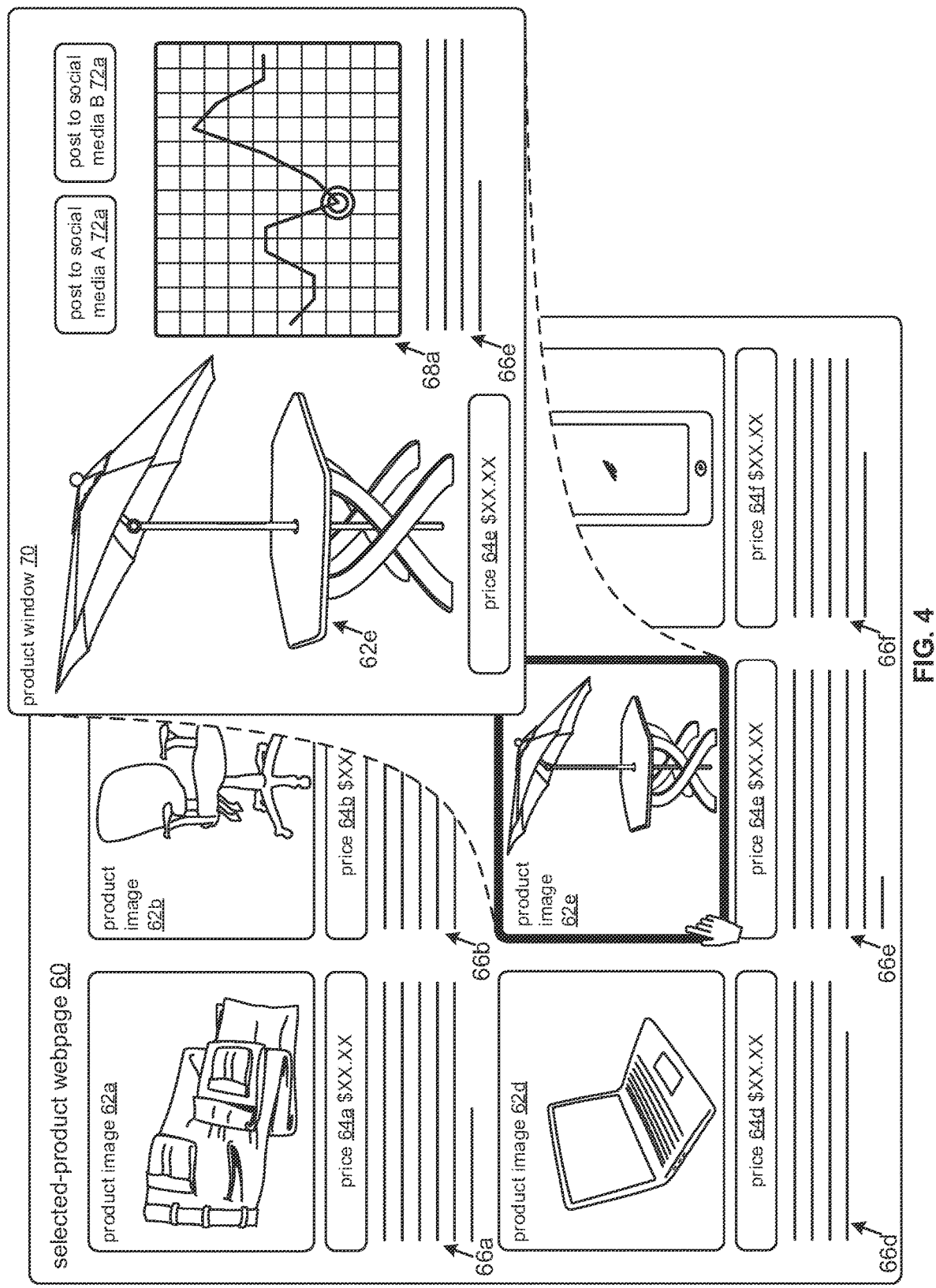
FIG. 4 is a schematic block diagram of one example of a display of a report on a set of products a potential low prices for an interval of time, together with features to engage a customer and to promote decision making, such as a graph of historical prices for a product, in accordance with examples.

Referring to FIG. 4, one example of a potential format for displaying the subset of products is 12 depicted. In such examples, the presentation module 58 may format information about the subset of products 12 for display on one or more selected-product webpages 60. Depending on the example, a selected-product webpage 60 may, for example and without limitation, be accessible and/or promoted on a retailer's website or part of a stand-alone website devoted providing viewers with information on products 10 with a potential to be at periodic lows.

In such examples, the presentation module 58 may be operable to interact with one or more databases to access and/or retrieve identification on products 10 in the subset of products 12 and/or information about the subset of products 12. Additionally, the presentation module 58 may utilize any number of technologies used to provide content and/or media on a website to display the information about the subset of products 12. For example, and without limitation, the presentation module 58 may utilize one or more extendible mark-up languages, such as, without limitation, HTML and/or scripting languages, such as, without limitation, JAVASCRIPT and/or JQUERY. As can be appreciated, any number of additional or alternative technologies for providing web content may be utilized by the presentation module 58.

By way of example and not limitation, the presentation module 58 may utilize such technologies to display the subset of products 12 together with information about the products 10 such as images 62a-f, or pictures 62a-f, of the products 10. The presentation module 58 may also display the current prices 64a-f for the corresponding products 10. Furthermore, the presentation module 58 may provide descriptive text 66a-f for individual products 10, providing details, descriptions, specifications, uses and/or the like for the corresponding products 10. As described above, such images 62a-f and other forms of information may be retrieved from one or more databases and/or files by the presentation module 58.

In some examples, a graph module, which may be included with or separate from the presentation module 58, may be provided. The graph module may be operable to plot a graph 68 of historical prices 26 over the predetermined time interval for a product 10 in the subset of products 12 for presentation with the information about the product. By providing a graph 68 of historical prices 26, such examples may enhance the service provided to users/viewers by providing substantially more information than a list of selected products 12 in the form of the historical prices 26. Additionally, or in the alternative, such a graph 68 may engage a user/viewer in a purchase-decision making process by providing an occasion to evaluate the current price 64e of a product 10 with respect historical prices 26 and/or may provide credibility for the favorability of the current price 64e to the user/viewer with the evidence embodied in the historical prices 26.

In some examples, to provide additional information about products, a graph 68 of historical prices 26, further avenues of engagement, and/or the like, the presentation module 58 may make one or more elements 62, 64, 66 clickable to provide further information about the subset of products 12. In such examples, the presentation module 58 may generate a separate product window 70 in response to such clicks. The separate product window 70 may represent the elements 62, 64, 66 and/or additional information, such as a graph 68 of historical prices 26.

Furthermore, although, as with the graph 68, a separate product window 70 may not always be relied upon, in some examples additional features included in the separate product window 70 may include one or more social-networking buttons 72a-b. A social-networking button 72 may be operable to post a purchase of and/or information about a given product 10 in the selected set 12, and/or the presentation set 12 itself on an account of a user/viewer viewing the presentation set 12. The account of the user/viewer may be maintained by a social networking platform to which the social-networking button 72 pertains. By way of example and not limitation, examples of such social networking platforms may include FACEBOOK, GOOGLE+, TWITTER, INSTAGRAM, TUMBLER, and PINTEREST, among many others.

As discussed, the information about products 10 at potentially periodic low prices offers a service to potential clients. To enhance the service and/or increase engagement, the historical data module 40, retrieval module 40, and/or subset-identification module 44, may be operable to periodically update the subset of products 12. In response, the presentation module 58 may be operable to format the information about the updated subset of products 12 for an updated display over a communication network. Such periodic updates may be made at one or more intervals of time, such as, without limitation, daily, weekly, monthly, seasonally, and/or quarterly, to create a following and/or increase traffic to the selected-product webpage 60 and/or the website of a retailer associated with the selected-product webpage 60. However, a webpage 60 is not the only vehicle by which the presentation module 58 may provide information about the selected subset of products 12, or presentation set 12. Another non-limiting example is provided below with respect to the following figure.

Figure 5:
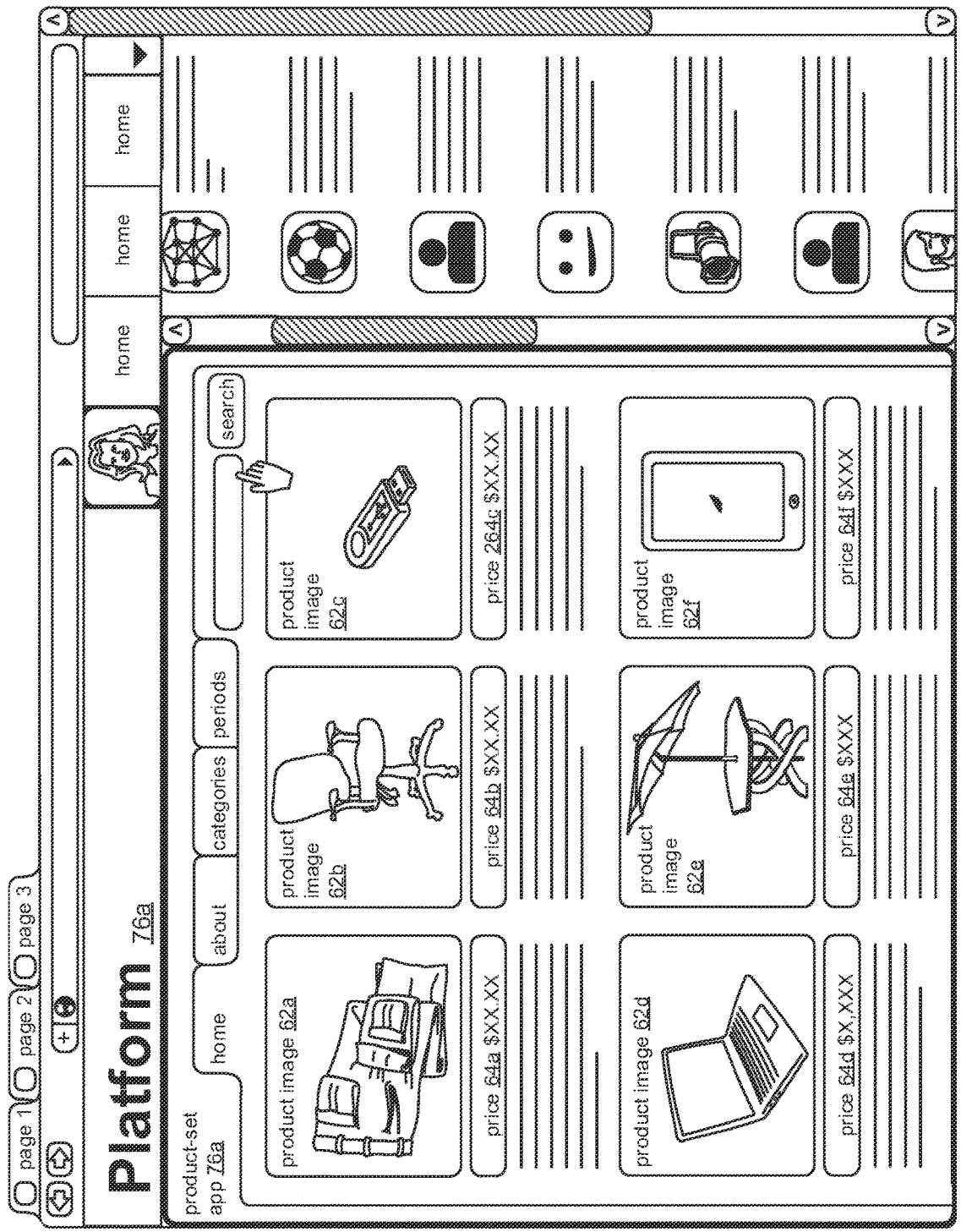
FIG. 5 is a schematic block diagram of one example of an application operable to display a periodically updated report on low-price products identified from historical data, where the application is operable on a social-networking platform, in accordance with examples.

Referring to FIG. 5, one example of another approach to communicating information about the selected subset of products 12 is depicted. The approach involves the creation of a dedicated application 74 operable to display an updatable report on low-price products. In such examples, the presentation module 58 may be operable to format information about the subset of products 12 to the application 74 for the report.

Various examples of different types of applications 74 are possible, from applications 74 deployable on a mobile device, such as a smart phone or tablet, to applications 74 supported by a social networking platform 76, such as the social networking platforms 76 listed above. The example depicted in FIG. 5 relates to an application 74a within a social networking platform 76a, such as, without limitation, FACEBOOK and/or the like. By creating an application 74 for a social networking platform 76, the "sticky" nature of social networking platforms 76, i.e., their ability to attract and/or sustain interactions with users, may be harnessed to further increase the exposure of potential customers. Furthermore, by placing information about products 10 in the space where information may be posted by a viewer, the potential for such posts about products 10, such as through the use of a social social-networking button 72, may be increased. However, social networking platforms 76 may be harnessed for much more than increasing exposure and/or social network postings.

Figure 6:
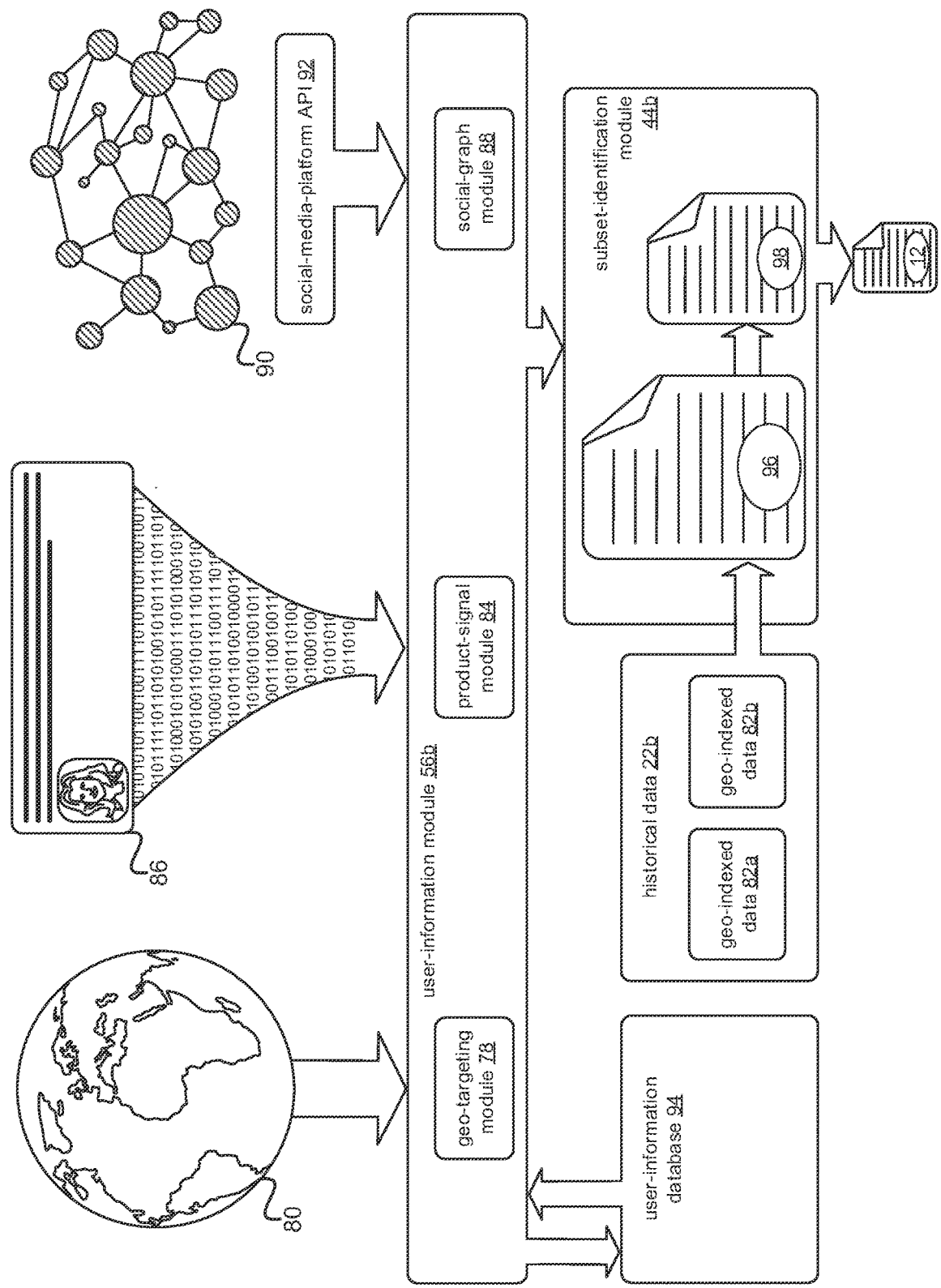
FIG. 6 is a schematic block diagram of different potential sources of information about potential viewers of the selected set of products that may be applied, in connection with historical data, to select products tailored to individual viewers, in accordance with examples.

Referring to FIG. 6, non-limiting examples of various sources of user/viewer information that may be accessed by the user-information module 56b are depicted, including sources harnessing unrealized potential in one or more social networking platforms 76. In some examples, individual modules within the user-information module 58 and/or separate and apart from the user-information module 58 may be operable to access user/viewer information from individual sources. For example, a geo-targeting module 78 may be provided with a system 20 for promoting products 10 with prices at potentially periodic lows.

The geo-targeting module 78 may be operable to determine a location of the user/viewer accessing the selected subset of products 12 by at least one geo-tracking method. Examples of geo-tracking methods may include methods relying on a choice by a user/viewer to provide location information, may rely on an indirect approach, such as by gathering the location information from a profile established by a user/viewer with a website, and/or may rely on an automated discovery technologies. Non-limiting examples of automated discovery may include extraction of geolocation from IP addresses, various forms of IP spidering, and/or the use of a geolocation service.

In such examples, a database may further index the historical data 22 to geographic regions 82a-b, in addition to products and instances in time. In such examples, a retrieval module 40 may be operable to retrieve historical data limited to a region 82a, 82b. The geographically-indexed data 82a, 82b may include the location of the user, as provided by the geo-targeting module 78.

A product-signal module 84 may provide an additional example of a module dedicated to providing user/viewer information. The product-signal module 84 and/or the user-information module 56b may be operable to retrieve, or access posts 86, or recent posts 86, from a social-networking account from a potential user/viewer. Examples of such posts 86 may include tweets 86, status updates, picture captions and/or any number of different types of social media posts 86. By way of one non-limiting example, where information about a selected subset 12 is provided on an application 74 supported by a social networking platform 76, the application 74 may provide access to the posts 86 which can thereby be indexed to the user/viewer.

The product-signal module 84 and/or the user-information module 56b may apply one or more natural language processing algorithms to posts 86 on a social networking platform 76. Such natural language processing algorithms may search posts 86 and/or identify and/or derive one or more product signals from the posts 86. Such product signals, which may be indexed to individual products 10, may indicate an interest of the poster in products 10 corresponding to the product signals. For example, a given product signal may be indicative of a presence of a poster of the posts 86 in a market for a product 10 corresponding to the product signal. Furthermore, the poster may correspond to a potential viewer of the presentation set 12, or selected subset of products 12.

For example, the product-signal module 84 and/or the user-information module 56b may search the posts 86 and/or identify product signals in the posts 86 by matching one or more key-word sets and/or key-word patterns to the posts 86. In some examples, the product-signal module 84 and/or the user-information module 56b may report the identified product signals in the information about the user/viewer. Additionally, and/or in the alternative, the product-signal module 84 and/or the user-information module 58b may generate an interest score for a product 10.

The interest score for a product 10 may provide an indication of the interest that a particular viewer/user may have in receiving information about and/or purchasing the product 10. The interest score may be derived, in some examples, by a weighted combination of one or more product signals indexed to the product. In such examples, certain product signals may be deemed to have a greater significance than others, which may be accounted for in the weighting for such signals. Such interest scores may be provided with the user information.

A social-graph module 88, which may or may not reside within the user-information module 56b, may provide another example of a module directed to acquiring user/viewer information from a social networking platform 76. In examples where the presentation module 58 prepares the selected presentation set of products 12 for an application 74 supported by a social networking platform 76, the social-graph module 88 may acquire user/viewer information from a social graph 90 maintained by the social networking platform 76.

More particularly, the user-information module 56b and/or the social-graph module 88 may generate information about the user based on the user's relationships to other elements in the social graph 90. For example, the user may have "liked" a business page for a company producing a product sold by a retailer implementing the system 20. Such a relationship, as indicated in the social graph 90, may indicate an interest by the user in one or more products 10.

By way of providing another non-limiting example, the user may have "friended," and/or created some other social networking relationship with, one or more other potential users, whose interests, searches, or purchasing patterns may be known. To the degree that a potential user may follow the user's "crowd," or social relations as indicated by the social networking graph 90, in having similar interests and/or purchasing patterns, such information about the interests and/or purchasing patterns may be attributed to the user in the user information.

In some examples, the social networking platform 76 may provide an Application Programming Interface (API) 92 for the applications 74 it supports, which may include an interface with the social graph 90 of the social networking platform 76. In such examples, the user-information module 56b and/or the social-graph module 88 may access the API 92 for a social graph 90 generated by a social networking platform 76. By means of the API 92, the user-information module 56b and/or the social-graph module 88 may identify relationships between the user and other elements in the social graph 90.

As can be appreciated, the foregoing is not an exhaustive list of potential sources of user/viewer information, but is provided by way of offering some non-limiting examples. Many additional sources of user information are possible. For example, the user-information module 56b may further be operable to retrieve the information about a user by accessing information about the user's purchasing patterns and/or the user's searches from a database. Such a database may be maintained, collected, and/or recorded, for example and not by way of limitation, for a website of a retailer implementing the system 20 for which the user logs in to engage the website.

The user information, regardless of the source, as discussed above, may be used to tailor the selected presentation set of products 12 to the user/viewer. For example, one or more product signals may be applied as one or more weighted factors in a weighted combination of factors used to select the presentation set 12. As another example, based on information about the potential viewer accessing the presentation set of products 12 over a communication network, products 10 for which historical data 22 is retrieved may be limited. However, as discussed above, other approaches to incorporating user information to tailor the subset of products 12 are also possible.

Inasmuch as one or more of the foregoing examples of sources of user information may benefit from being collected in advance of a potential user/viewer accessing the selected presentation set of products 12, such information may be collected in advance and maintained in a database with information about potential viewers 94 of the presentation set of products 12. In such examples, product signals, as discussed above, may be maintained and indexed to one or more potential viewers in the user-information database 94.

Once the historical-data module 40 retrieves the relevant historical data 22, the identification module 44 may identify the subset of products 12 for presentation. In some examples, as discussed above, this may involve making selections from historical data 22 collected for one or more sets for one or more categories of data. In FIG. 6, a scenario is depicted where an initial set 96 is collected, which the identification module 44b reduces to a narrowed set 98 by application of a first category of historical data 22. Based on a second category of historical data 22, the identification module 44b may then reduce the narrowed set 98 into the final selection set 12, with user information potentially playing a role at one or more stages in this process.

As can be appreciated, in some examples only a single reduction stage may be employed. For example, in some cases, the selection module 48 may be operable to select products 10 for a presentation set 12 based on a weighted comparison of interest scores and/or relatively low prices 14 and/or relatively high sales numbers at the historical-reference time relative to prices 26 and sales numbers 28 from the set of historical times 24 for products offered by the retailer. As discussed above, additional approaches are possible.

Figure 7:
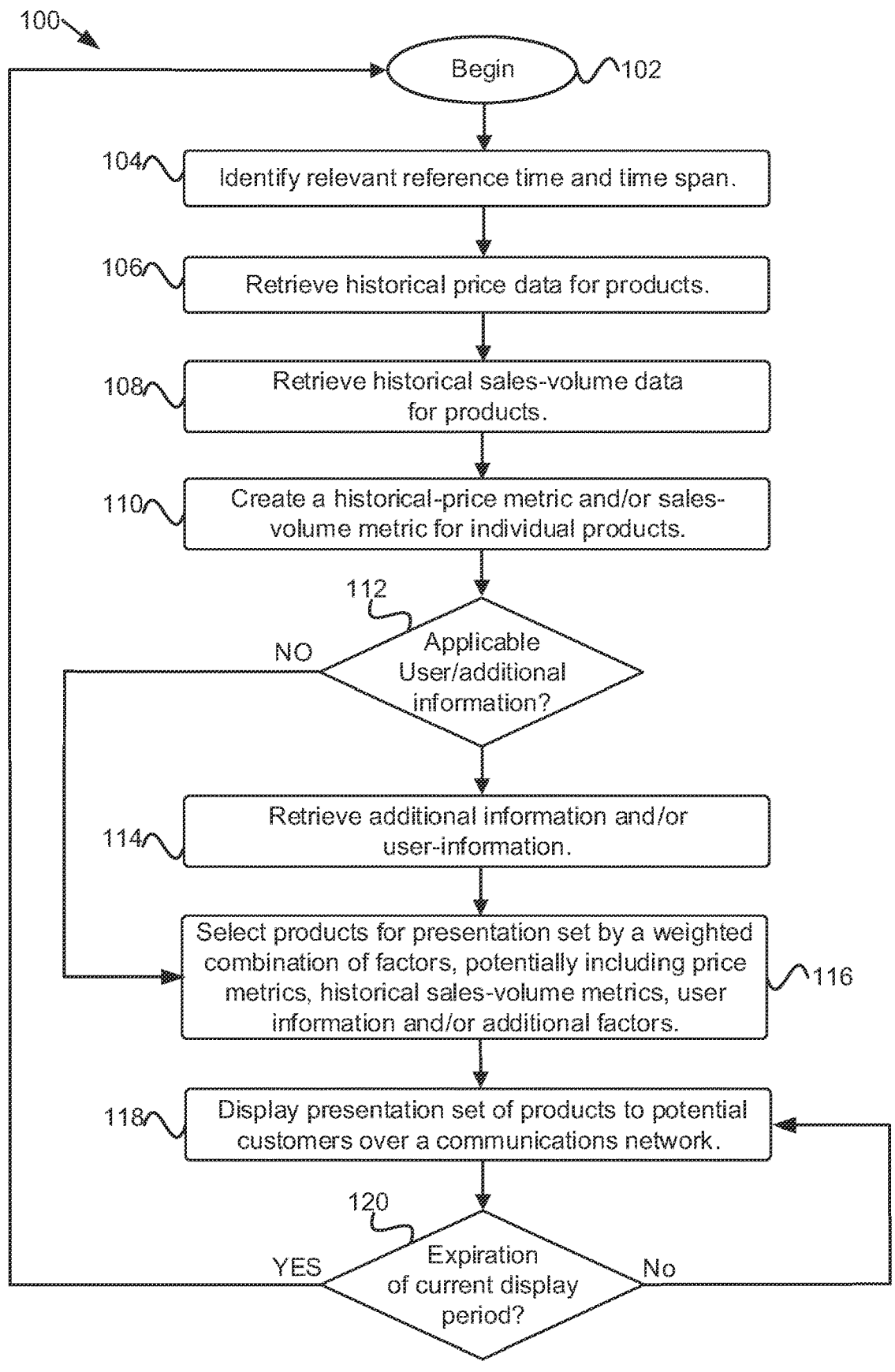
FIG. 7 is a flow chart of certain exemplary methods for engaging potential customers by harnessing historical data and/or potential information about a viewer, such as information collected from the viewer's social media activity to report on products at, or near, potential lows for a given period of time, in accordance with examples.

Referring to FIG. 7, methods 100 for engaging potential customers by providing a report on products 10 at, or near, potential low prices for a given period of time are provided to round out the disclosures herein. The flowchart in FIG. 7 illustrates the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The methods 100 may begin 102 by identifying 104 a reference time and a time span that are relevant to the present time, with the historical-data module 40 and/or the retrieval module 40 potentially carrying out these operations. The historical-data module 40 and/or the retrieval module 40 may also retrieve historical data 22 from a database by retrieving 106 historical prices 26 and/or retrieving 108 historical sales data 28 for one or more sets of products, which may be offered by a retailer.

One or more of such methods 100 may proceed by creating 110 a historical-price metric and/or a sales-volume metric for individual products 10. Such tasks may be accomplished by, for example, the subset-identification module 44 and/or the comparison module 46 comparing prices 26 and/or sales data 28 for the reference time to corresponding prices 26 and sales data 28 for the span of time for the individual products 10 in the one or more sets of products for which historical data 22 has been retrieved. A determination 112 may be made as to whether additional information, such as profit margins on individual products 10, and/or user/viewer information is available.

Where the answer is yes, methods 100 may proceed by retrieving 114 the additional information and/or user/viewer information with, for example, assistance from a user-information module 56. The selecting 116 of a presentation set of products 12 from the one or more set of products may be based on a weighted combination of factors. Such factors may include historical-price metrics, high-sales-volume metrics, one or more categories of additional information, and/or one or more categories of user information. Where the answer is no, methods 100 may proceed directly to selecting 116 the presentation set of products 12.

Once the selection step 116 has produced a presentation set 12, methods may proceed by presenting 118 the presentation set of products 12 for display over a communication network. In some examples, the presentation module 58, as discussed above, may implement this step 118. A second determination 120 may then be made as to whether a current display period has expired. Where the answer is yes, methods 100 may return to the beginning 102. Where the answer is no, methods 100 may continue to display 118 the presentation set of products 12 over the communication network.

As can be appreciated, methods 100 may include fewer steps or one or more additional steps. For example, and by way of illustration and not limitation, an additional step may involve plotting a graph 68 of historical prices 26 of a product 10 in the presentation set of products 12 for presentation with the product 10 during presentation of the presentation set of products 12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system comprising:
 a historical data system operable to retrieve, by one or more processors from a database, historical data comprising one or more historical prices of each product of a pricing set of products offered for sale by a retailer over a predefined period of time;
 a subset-identification system operable to identify a subset of products from the pricing set of products for promotion by:
  analyzing, by the one or more processors and based on the historical data, the one or more historical prices of a first product of the pricing set of products over the predefined period of time;
  identifying, by the one or more processors, one or more first time periods within the predefined period of time in which the first product has one or more lower prices than in one or more second time periods within the predefined period of time;
  identifying, by the one or more processors, a reference time within the predefined period of time, the reference time corresponding to a present time;
  comparing, by the one or more processors, a reference historical price of the one or more historical prices of the first product at the reference time with a second historical price of at least one second product of one or more other products of the pricing set of products at the reference time; and
  when (a) the reference time is within the one or more first time periods and (b) the reference historical price of the one or more historical prices of the first product at the reference time is relatively low over the predefined period of time compared to the one or more other products of the pricing set of products at the reference time,
  adding the first product to the subset of products; and
 a presentation system operable to:
  provide information about the subset of products, by the one or more processors, for display on a user interface of a user computer over a communication network; and
  upon receiving a product selection, provide product display information about the product selection, by the one or more processors, for display on a second user interface of the user computer over the communication network, wherein:
   the product selection is associated with a selected product of the subset of products and received by the one or more processors from the user computer over the communication network; and
   according to the product display information, the user computer is configured to:
    automatically detect a product area of the user interface for the selected product; and
    automatically display the second user interface over a portion of the user interface and near the product area of the user interface while not obstructing the product area.

2. The system of claim 1, wherein:
 the historical data further comprises one or more historical sales-volumes of each product of a sales set of products, from the retailer; and
 the subset-identification system is further operable to:
  analyze, by the one or more processors and based on the historical data, the one or more historical sales-volumes of a second product of the sales set of products, over the predefined period of time;
  identify, by the one or more processors, one or more third time periods within the predefined period of time in which the second product has one or more higher historical sales-volumes than in one or more fourth time periods within the predefined period of time; and when (a) the reference time is within the one or more third time periods and (b) a reference historical sales-volume of the one or more historical sales-volumes of the second product at the reference time is relatively high compared to one or more second other products of the sales set of products at the reference time, add the second product to the subset of products.

3. The system of claim 1, wherein:

the presentation system is operable to plot a graph of the one or more historical prices of a product of the subset of products over the predefined period of time; and the information about the subset of products for display on the user interface of the user computer further comprises the graph.

4. The system of claim 2, further comprising a user-information system operable to:

retrieve, by the one or more processors and from the database, information about a user, the user having a potential to access the subset of products via the user interface of the user computer over the communication network;

wherein, the subset-identification system is further operable to tailor, by the one or more processors, the subset of products for display to the user, on the user interface of the user computer, based on the information about the user by at least one of:

(a) identifying, by the one or more processors and from the subset of products, at least one product not of interest to the user based on the information about the user; and removing the at least one product not of interest to the user from the subset of products; or (b) generating, by the one or more processors, an interest score of the each product of at least one of the pricing set of products or the sales set of products by applying the information about the user to the each product; and only one of:

(1) when the interest score of the each product is favorable, adding the each product to the subset of products; or (2) retrieving, from the historical data, individual historical data of the each product over the predefined period of time, the individual historical data of the each product comprising the one or more historical prices and the one or more historical sales-volumes of the each product;

determining a weighted value of the each product, based in part on one or more of:

a historical price of the one or more historical prices of the individual historical data at the reference time, a historical sales volume of the one or more historical sales-volumes of the individual historical data at the reference time, or the interest score of the each product; and when the weighted value of the each product is favorable, adding the each product to the subset of products.

5. The system of claim 4, wherein:

the user-information system is further operable to:

retrieve, by the one or more processors, one or more recent posts from a social-networking account of the user; and identify, by the one or more processors, one or more product signals associated with one or more individual products of at least one of the pricing set of products or the sales set of products in the one or more recent posts by matching at least one of key-word sets or key-word patterns to the one or more recent posts; and the information about the user further comprises the one or more product signals.

6. The system of claim 4, wherein:

the user-information system is further operable to:

access, by the one or more processors, a social graph, associated with the user, generated by a social networking platform; and identify one or more relationships between the user and one or more other elements in the social graph; and the information about the user further comprises the one or more relationships in the social graph.

7. The system of claim 4, wherein the information about the user further comprises purchasing patterns and searches of the user stored in the database.

8. The system of claim 2, further comprising a margin system operable to:

retrieve, by the one or more processors and from the database, a profit margin of a third product of at least one of the pricing set of products or the sales set of products;

wherein:

the subset-identification system is further operable to:

when the profit margin of the third product is relatively high compared to one or more third other products in the subset of products, add the third product to the subset of products.

9. The system of claim 2, wherein the historical data system, the subset-identification system, and the presentation system are operable to periodically update the subset of products and to provide the information about the subset of products as updated for display on the user interface of the user computer over the communication network.

10. A system comprising:

a database maintained by a retailer and storing historical data, wherein, the historical data comprise one or more prices and one or more sales numbers of each product of products offered by the retailer over a predefined period of time;

a retrieval system operable to:

retrieve, by one or more processors, the historical data from the database;

a comparison system operable to:

analyze, by the one or more processors and based on the historical data, the one or more prices and the one or more sales numbers of a first product of the products over the predefined period of time;

identify, by the one or more processors, one or more first time periods within the predefined period of time in which the first product has one or more lower prices than in one or more second time periods within the predefined period of time;

identify, by the one or more processors, one or more third time periods within the predefined period of time in which the first product has one or more higher sales numbers than in one or more fourth time periods within the predefined period of time;

identify, by the one or more processors, a reference time within the predefined period of time, the reference time corresponding to a present time;

compare, by the one or more processors, a reference historical price of the one or more prices of the first product at the reference time with a second historical price of at least one second product of one or more first other products of the products at the reference time; and compare, by the one or more processors, a reference historical sales number of the one or more sales numbers of the first product at the reference time with a second historical sales number of the at least one second product of the one or more first other products at the reference time;

a selection system operable to identify products-for-presentation from the products for promotion by adding the first product to the products-for-presentation, when (a) the reference time is within the one or more first time periods, (b) the reference time is within the one or more third time periods, (c) the reference historical price of the one or more prices of the first product at the reference time is relatively low over the predefined period of time compared to the one or more first other products of the products at the reference time, and (d) the reference historical sales number of the one or more sales numbers of the first product at the reference time is relatively high compared to the one or more first other products at the reference time; and a presentation system operable to:
  provide information about the products-for-presentation, by the one or more processors, for display on a user interface of a user computer over a communication network; and
  upon receiving a product selection, provide product display information about the product selection, by the one or more processors, for display on a second user interface of the user computer over the communication network, wherein:
    the product selection is associated with a selected product of the products-for-presentation and received by the one or more processors from the user computer over the communication network; and
    according to the product display information, the user computer is configured to:
      automatically detect a product area of the user interface for the selected product; and
      automatically display the second user interface over a portion of the user interface and near the product area of the user interface while not obstructing the product area.

11. The system of claim 10, wherein:
the retrieval system is further operable to retrieve, by the one or more processors and from the historical data, a first category of historical attributes of an initial set of products of the products, wherein:
  the first category of historical attributes comprise first one of the one or more prices or the one or more sales numbers of each product of the initial set of products; and
  the initial set of products is selected, by the one or more processors from the products based on the first category of historical attributes;

the selection system is further operable to:
  when (a) the first category of historical attributes comprise the one or more prices of the each product of the initial set of products and (b) a historical price of the one or more prices of a second product of the initial set of products at the reference time is relatively low compared to one or more second other products of the initial set of products, add the second product to a narrowed set of products; and
  when (a) the first category of historical attributes comprise the one or more sales numbers of the each product of the initial set of products and (b) a historical sales number of the one or more sales numbers of a third product of the initial set of products at the reference time is relatively high compared to one or more third other products of the initial set of products, add the third product to the narrowed set of products;

the retrieval system is further operable to retrieve, by the one or more processors and from the historical data, a second category of historical attributes of the narrow set of products from the historical data of the products, wherein:
  the second category of historical attributes comprise second one of the one or more prices or the one or more sales numbers of each product of the narrowed set of products;

the selection system is further operable to:
  when (a) the second category of historical attributes comprise the one or more sales numbers of the each product of the narrowed set of products and (b) a historical sales number of the one or more sales numbers of a fourth product of the narrowed set of products at the reference time is relatively high compared to one or more fourth other products of the narrowed set of products, add the fourth product to a selected set of products; and
  when (a) the second category of historical attributes comprise the one or more prices of the each product of the narrowed set of products and (b) a historical price of the one or more prices of a fifth product of the narrowed set of products at the reference time is relatively low compared to one or more fifth other products of the narrowed set of products, add the fifth product of the narrowed set of products to the selected set of products; and the presentation system is further operable to provide information about the selected set of products, by the one or more processors, for display on the user interface of the user computer over the communication network.

12. The system of claim 10, wherein the presentation system is further configured to provide the information about the products-for-presentation for display on a social networking platform.

13. The system of claim 12, further comprising a user-information system operable to:
  access, by the one or more processors, one or more posts by a user on the social networking platform;
  search, by the one or more processors, the one or more posts for one or more product signals associated with a particular product of the products, wherein:
    the one or more product signals are found, when (a) the one or more posts comprise at least one of one or more key-word sets or one or more keyword patterns and (b) the at least one of one or more key-word sets or one or more keyword patterns are associated with the particular product of the products; and generate, by the one or more processors, an interest score of the particular product of the products by a weighted combination of the one or more product signals associated with the particular product.

14. The system of claim 13, wherein the selection system is further operable to add the first product of the products to the products-for-presentation when a weighted combination of an interest score of the first product, the reference historical price of the first product, and the reference historical sales number of the first product is favorable, wherein:

the weighted combination is favorable when at least one of:

the interest score of the first product is relatively high compared to one or more first other products of the products;

the reference historical price of the first product at the reference time is relatively high compared to the one or more first other products of the products; or the reference historical sales number of the first product at the reference time is relatively high compared to the one or more first other products of the products.

15. The system of claim 10, further comprising a geo-targeting system operable to determine, by the one or more processors, a location of a user by at least one geo-tracking method; wherein:

the historical data further comprises geographic regions of the products; and the retrieval system is further operable to retrieve the historical data limited to a region of the geographic regions including the location of the user.

16. A method being implemented via execution of computing instructions configured to run at one or more processors and stored at one or more non-transitory computer-readable media, the method comprising:

identifying a reference time within a predefined period of time, the reference time being corresponding to a present time;

retrieving historical data from a database, the historical data comprising at least one of one or more historical prices or one or more historical sales volumes of each product of at least one set of products offered by a retailer over the predefined period of time;

creating at least one of a historical-price metric or a sales-volume metric of the each product of the at least one set of products, wherein:

the historical-price metric of the each product of the at least one set of products comprises one or more relative prices between a historical price of the each product of the at least one set of products at the reference time and one or more other historical prices of the each product of the at least one set of products over the predefined period of time; and the sales-volume metric of the each product of the at least one set of products comprises one or more relative sales volumes between a historical sales volume of the each product of the at least one set of products at the reference time and one or more other historical sales volumes of the each product of the at least one set of products over the predefined period of time;

selecting a presentation set of products for promotion from the at least one set of products based on a weighted combination of factors, the factors comprising at least one of historical-price metrics of the at least one set of products or sales-volume metrics of the at least one set of products, by:

when the factors comprise the historical-price metrics:

analyzing the historical-price metric of a first product of the at least one set of products;

identifying one or more first time periods within the predefined period of time in which the first product has one or more lower prices than in one or more second time periods within the predefined period of time;

comparing a first historical price of the first product at the reference time with a second historical price of at least one second product of the at least one set of products at the reference time; and when (a) the reference time is within the one or more first time periods and (b) the first historical price of the first product at the reference time is comparably lower across the predefined period of time than the second historical price of the at least one second product of the at least one set of products at the reference time, the weighted combination of factors is more favorable to adding the first product to the presentation set of products than adding the at least one second product to the presentation set of products; and when the factors comprise the sales-volume metrics:

analyzing the sales-volume metric of the first product of the at least one set of products;

identifying one or more third time periods within the predefined period of time in which the first product has one or more higher historical sales volumes than in one or more fourth time periods within the predefined period of time;

comparing a first historical sales volume of the first product at the reference time with a second historical sales volume of the at least one second product of the at least one set of products at the reference time; and when (a) the reference time is within the one or more third time periods and (b) the first historical sales volume of the first product at the reference time is higher than the second historical sales volume of the at least one second product of the at least one set of products at the reference time, the weighted combination of factors is more favorable to adding the first product to the presentation set of products than adding the at least one second product to the presentation set of products;

presenting the presentation set of products for display, on a user interface of a user computer over a communication network; and upon receiving a product selection, presenting product display information about the product selection for display, on a second user interface of the user computer over the communication network, wherein:

the product selection is associated with a selected product of the presentation set of products and received from the user computer over the communication network; and according to the product display information, the user computer is configured to:

automatically detect a product area of the user interface for the selected product; and automatically display the second user interface over a portion of the user interface and near the product area of the user interface while not obstructing the product area.

17. The method of claim 16, further comprising:
applying a natural language processing algorithm to one or more posts by a poster on a social networking platform to derive a product signal, wherein:
   the product signal is indicative of an interest in a product of the poster; and
   the poster is a potential viewer of the presentation set of products;
maintaining an association of the product signal with the potential viewer in a potential viewer database; and
applying the product signal as a factor of the factors for selecting the presentation set of products.

18. The method of claim 16 further comprising:
maintaining a potential viewer database with information about one or more potential viewers of the presentation set of products; and
limiting the presentation set of products based on information about a first potential viewer of the one or more potential viewers, when the presentation set of products is presented for display on a user interface of a user computer of the first potential viewer over the communication network.

19. The method of claim 16, further comprising plotting a graph of historical prices of a particular product of the presentation set of products with the particular product for display, on the user interface of the user computer over the communications network.

20. The method of claim 16, further comprising presenting a social-networking control, for display on a user interface of a user computer of a user, with the presentation set of products, wherein:
   the social-networking control is operable to post information about the presentation set of products on an account of the user viewing the presentation set of products; and
   the account is maintained by a social networking platform.

21. The system of claim 1, wherein:
the subset-identification system is configured to add the first product to the subset of products regardless of any user preference, inquiry, or selection received from the user computer over the communication network.

22. The system of claim 10, wherein:
the selection system is operable to add the first product to the products-for-presentation regardless of any user preference, inquiry, or selection received from the user computer over the communication network.

23. The method of claim 16, wherein:
selecting the presentation set of products occurs regardless of any user preference, inquiry, or selection received from the user computer over the communication network.

* * * * *